(12) United States Patent
Hirai (10) Patent No.: US 12,134,297 B2
(45) Date of Patent: Nov. 5, 2024

(54) REAR SUSPENSION CONSTRUCTION

(71) Applicant: HONDA MOTOR CO., LTD., Tokyo (JP)

(72) Inventor: Hideki Hirai, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/456,886

(22) Filed: Aug. 28, 2023

(65) Prior Publication Data

US 2024/0075786 A1    Mar. 7, 2024

(30) Foreign Application Priority Data

Sep. 6, 2022  (JP) ................................. 2022-141270

(51) Int. Cl.
*B60G 21/05*    (2006.01)
(52) U.S. Cl.
CPC ........ *B60G 21/052* (2013.01); *B60G 2200/21* (2013.01); *B60G 2204/41* (2013.01)
(58) Field of Classification Search
CPC .............. B60G 21/052; B60G 2200/21; B60G 2204/41; B60G 2200/462
See application file for complete search history.

(56) References Cited

U.S. PATENT DOCUMENTS

| | | | | |
|---|---|---|---|---|
| 3,586,346 A * | 6/1971 | Sautter | ................. | B60G 11/182 280/124.156 |
| 4,157,840 A * | 6/1979 | Kroniger | .................. | B60G 3/26 280/5.52 |
| 4,513,990 A * | 4/1985 | Morita | ..................... | B60G 7/02 267/281 |
| 4,650,209 A * | 3/1987 | Sumimoto | ........... | B60G 99/004 280/124.13 |
| 5,765,858 A * | 6/1998 | Kawagoe | .................. | F16F 9/38 280/124.179 |
| 2010/0052271 A1* | 3/2010 | Vaxelaire | ............... | B60G 7/008 280/5.524 |
| 2012/0013095 A1* | 1/2012 | Gerrard | .................. | B60G 7/008 280/124.134 |
| 2015/0014956 A1* | 1/2015 | Roland | ................ | B60G 21/007 280/124.128 |
| 2016/0339755 A1* | 11/2016 | Nine | ...................... | B60G 9/003 |

FOREIGN PATENT DOCUMENTS

JP         6218025 B2    10/2017

* cited by examiner

*Primary Examiner* — Frank B Vanaman
(74) *Attorney, Agent, or Firm* — Rankin, Hill & Clark LLP (57) ABSTRACT

A hub carrier includes a front arm part extending toward an inner side of a vehicle on a front side of an axle of a rear wheel; and a rear arm part extending on a rear side of the axle of the rear wheel. The rear arm part is joined to a lateral beam on the rear side of the axle of the rear wheel. A vehicle rear end portion of a trailing arm, extending in a vehicle front-rear direction, is joined to the lateral beam. A vehicle front end portion of the trailing arm is joined to a vehicle body using a first bush. A front arm part is joined to a front arm attachment part disposed on the trailing arm using a second bush. First and second support shafts of the first and second bushes have respectively axial directions oriented differently from each other.

6 Claims, 10 Drawing Sheets

|  | FRONT-REAR INPUT | LEFT-RIGHT INPUT | BRAKE INPUT |
|---|---|---|---|
| FIRST BUSH | ◎ | ○ | ○ |
| SECOND BUSH | — | ◎ | ◎ |
| THIRD BUSH | ◎ | ○ | ◎ |

◎ MAIN INPUT

○ SUB INPUT

— NOT POSITIVELY OPERATE

REAR SUSPENSION CONSTRUCTION

CROSS-REFERENCE TO RELATED APPLICATIONS

This application claims the benefit of priority under 35 U.S.C. § 119 to Japanese Patent Application No. 2022-141270 filed on Sep. 6, 2022; the entire contents of which are incorporated herein by reference.

BACKGROUND

The present disclosure relates to a rear suspension construction that supports a rear wheel of a vehicle.

Patent Document 1 (JP6218025B), for example, discloses a torsion beam-type rear suspension construction. In this rear suspension construction, a torsion beam is disposed on the front side of a vehicle relative to the axle of its rear wheels, and a pair of trailing arms are coupled to both longitudinal ends of the torsion beam.

Moreover, in Patent Document 1, each trailing arm includes a vehicle body attachment point disposed at a vehicle front end portion extending toward the front of the vehicle, and a wheel support point disposed at a vehicle rear end portion extending toward the rear of the vehicle. In this torsion beam-type rear suspension construction, the torsion beam gets twisted. This supposedly allows independent suspension of the left and right rear wheels.

In recent years, research and development has been conducted on vehicle body stiffness that contributes to improving energy efficiency in order to ensure that more people can have access to affordable, reliable, connectable, and advanced energy.

Incidentally, in the torsion beam-type rear suspension construction disclosed in Patent Document 1, when a lateral force is exerted on a rear wheel, the lateral force is transmitted to the torsion beam through the corresponding trailing arm. For this reason, the torsion beam in the torsion beam-type rear suspension construction disclosed in Patent Document 1 is required to have high flexural stiffness.

However, if the flexural stiffness of the torsion beam is excessively high, it will be difficult for the torsion beam to twist. This may impair the operation of independently suspending the left and right rear wheels. The torsion beam-type rear suspension construction therefore needs to balance flexural stiffness and torsional stiffness.

SUMMARY

The present disclosure has been made in view of the above fact, and is direct to a rear suspension construction capable of balancing flexural stiffness and torsional stiffness.

A rear suspension construction for supporting a rear wheel of a vehicle according to the present disclosure includes a hub carrier. The hub carrier includes a wheel support part that rotatably supports the rear wheel, and a front arm part extending toward an inner side of a vehicle on a front side of the vehicle relative to an axle of the rear wheel. The hub carrier includes a rear arm part extending on a rear side of the vehicle relative to the axle of the rear wheel. The construction includes a lateral beam extending in a vehicle width direction on the rear side of the vehicle relative to the axle and joined to the rear arm part. The construction includes a trailing arm extending in a vehicle front-rear direction and having a vehicle rear end portion joined to at least one of the hub carrier or the lateral beam. The construction includes a first bush joining a vehicle front end portion of the trailing arm to a vehicle body. The construction includes a second bush joining the front arm part to a front arm attachment part disposed on the trailing arm. Respective axial directions of a first support shaft of the first bush and a second support shaft of the second bush are oriented differently from each other.

According to the present disclosure, it is possible to obtain a rear suspension construction capable of balancing flexural stiffness and torsional stiffness. As a result, the present disclosure contributes to improving energy efficiency.

DESCRIPTION OF EMBODIMENT

Next, an embodiment of the present disclosure will be described in detail with reference to the drawings as appropriate. Note that in the drawings, "front-rear" represents a vehicle front-rear direction, "left-right" represents a vehicle width direction (left-right direction), and "up-down" represents a vehicle up-down direction (vertically up-down direction).

Figure 1:
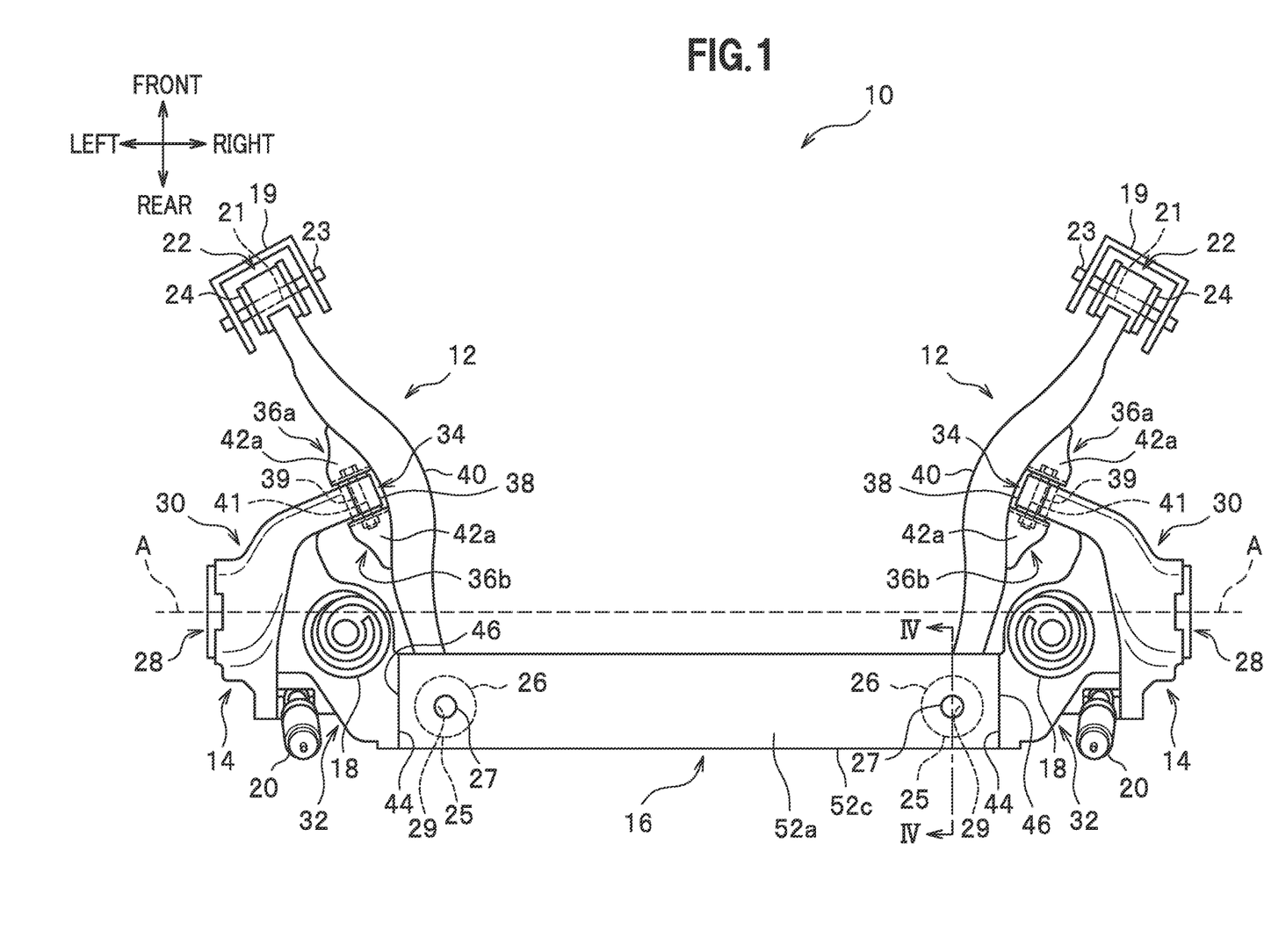
FIG. 1 is a plan view of a rear suspension employing a rear suspension construction according to an embodiment of the present disclosure.

As shown in FIG. 1, a rear suspension construction according to an embodiment of the present disclosure is used in a rear suspension 10 for supporting the rear wheels of a vehicle. This rear suspension 10 includes a pair of left and right trailing arms 12, a pair of left and right hub carriers 14, a lateral beam 16, and a pair of left and right coil springs 18 and dampers 20.

Each of the trailing arms 12 is formed as a hollow member having a closed cross section therein. In plan view, the trailing arms 12 are disposed so as to spread in such a V-shape that portions closer to the front of the vehicle are situated outward of portions closer to the rear of the vehicle in the vehicle width direction.

At a vehicle front end portion of each trailing arm 12, a vehicle body attachment part 22 is disposed via which this vehicle front end portion is attached to a vehicle-body member not shown. This vehicle body attachment part 22 is formed as an annular member. A first bush 24 having a rubber elastic member is mounted in this annular member.

This first bush 24 is provided with a first fixing hole 21 to fix a first support shaft 23 fitted in the center of the first bush 24. The first support shaft 23 extends substantially in the vehicle width direction through the first fixing hole 21. The first fixing hole 21 will be described later in detail. The first bush 24 includes a bracket 19 to be attached to the vehicle-body member (e.g., a side sill, a rear frame). This bracket 19 assumes a bifurcated, substantially U-shape in plan view, and includes a pair of support holes to pivotally support both ends of the first support shaft 23.

The vehicle body attachment part 22 of each trailing arm 12 is coupled to the vehicle-body member (e.g., the side sill, the rear frame, or the like) via the first support shaft 23 of the first bush 24 so as to be swingable in the vehicle up-down direction. The first bush 24 will be described later in detail.

Figure 3:
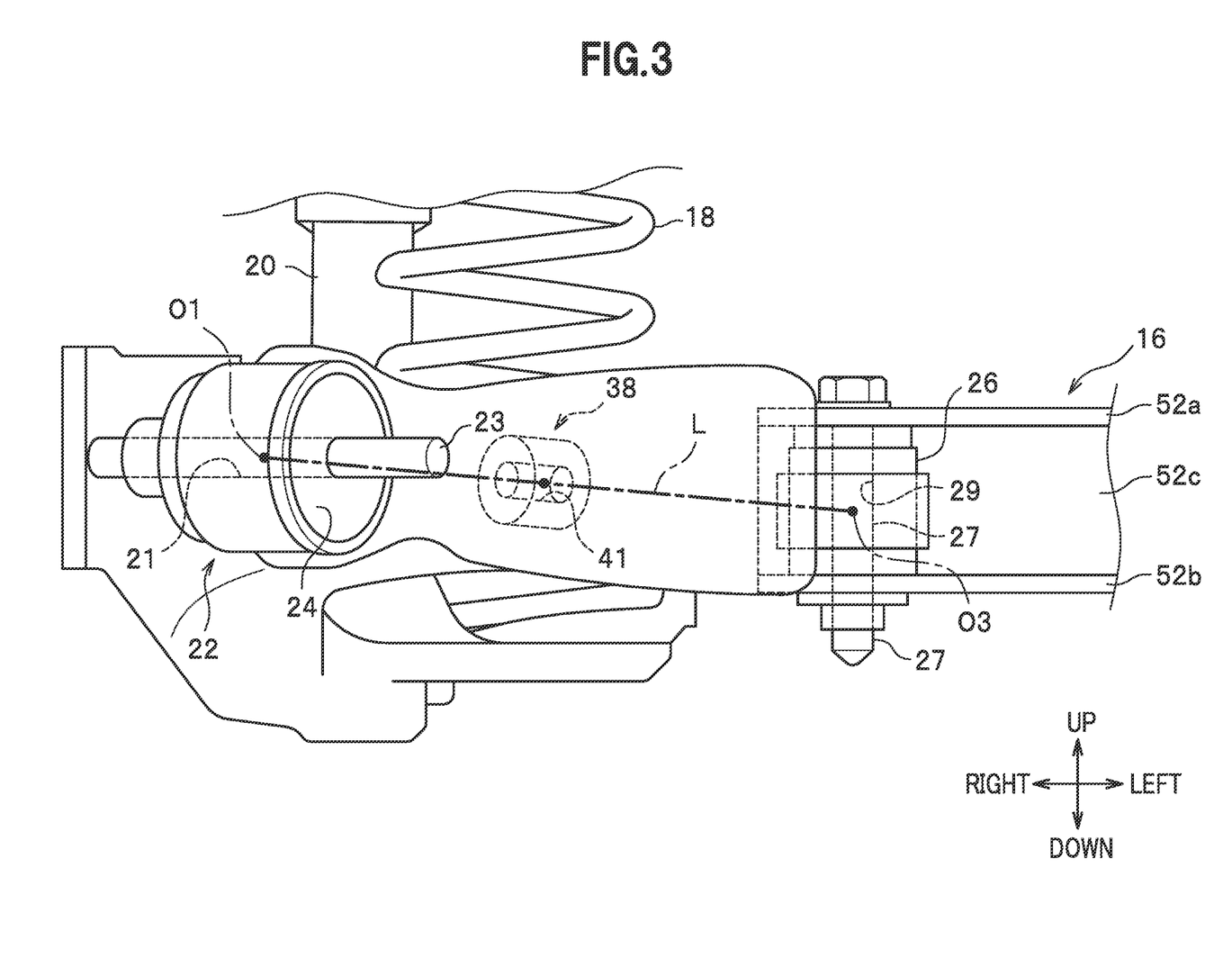
FIG. 3 is a partial enlarged perspective view of the rear suspension shown in FIG. 2 as seen from the front of the vehicle.

A vehicle rear end portion 25 of each trailing arm 12 (see FIG. 4) is coupled to the lateral beam 16 via a third bush 26 (see FIG. 3). The third bush 26 is fitted in an annular member disposed at the vehicle rear end portion 25 of the trailing arm 12 (see FIG. 4), and includes a third support shaft 27 extending in the vehicle up-down direction. The third bush 26 is provided with a third fixing hole 29 to fix the third support shaft 27 fitted in the center of the third bush 26. This third support shaft 27 extends in the vehicle up-down direction through the third fixing hole 29 (see FIG. 4). The third fixing hole 29 will be described later in detail.

Figure 5:
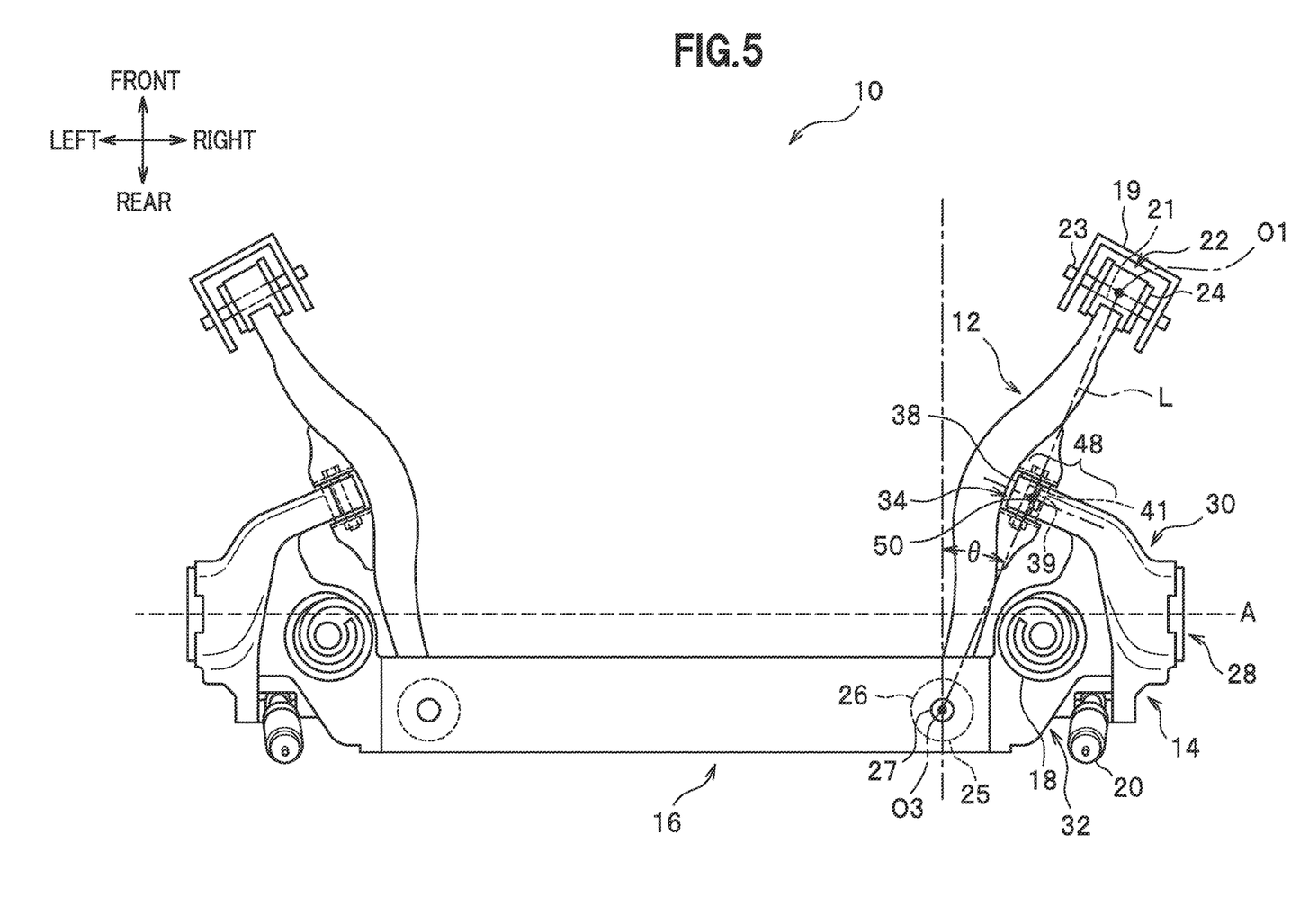
FIG. 5 is a plan view showing a phantom line L and an oblique angle θ.

As shown in FIG. 5, in the present embodiment, the vehicle front end portion of each trailing arm 12 (vehicle body attachment part 22) is disposed at an oblique angle θ toward the outer side in the vehicle width direction in plan view so as to be situated on the outer side of the vehicle relative to the vehicle rear end portion 25. In other words, the pair of left and right trailing arms 12 are disposed in a substantially V-shape in plan view.

In the present embodiment, the vehicle rear end portion 25 of each trailing arm 12 is coupled to the lateral beam 16 via the third bush 26, but the present embodiment is not limited to this configuration. For example, the vehicle rear end portion 25 may be coupled to the corresponding hub carrier 14. The lateral beam 16 will be described later in detail.

Each hub carrier 14 is formed as a construction holding a hub (not shown) which supports the corresponding wheel (a tire and a wheel) and on which the wheel rotates. This hub carrier 14 includes a wheel support part 28 which rotatably supports the rear wheel (see FIG. 1).

As shown in FIG. 1, each hub carrier 14 is formed so as to bifurcate toward the front and rear of the vehicle. Specifically, the hub carrier 14 includes a front arm part 30 extending toward the inner side of the vehicle on the front side of the vehicle relative to an axle A of the rear wheels; and a rear arm part 32 extending on the rear side of the vehicle relative to the axle A of the rear wheels. In the present embodiment, the front and rear arm parts 30 and 32 are formed integrally with each other. The front and rear arm parts 30 and 32 may be separately manufactured and coupled into a single body.

Figure 2:
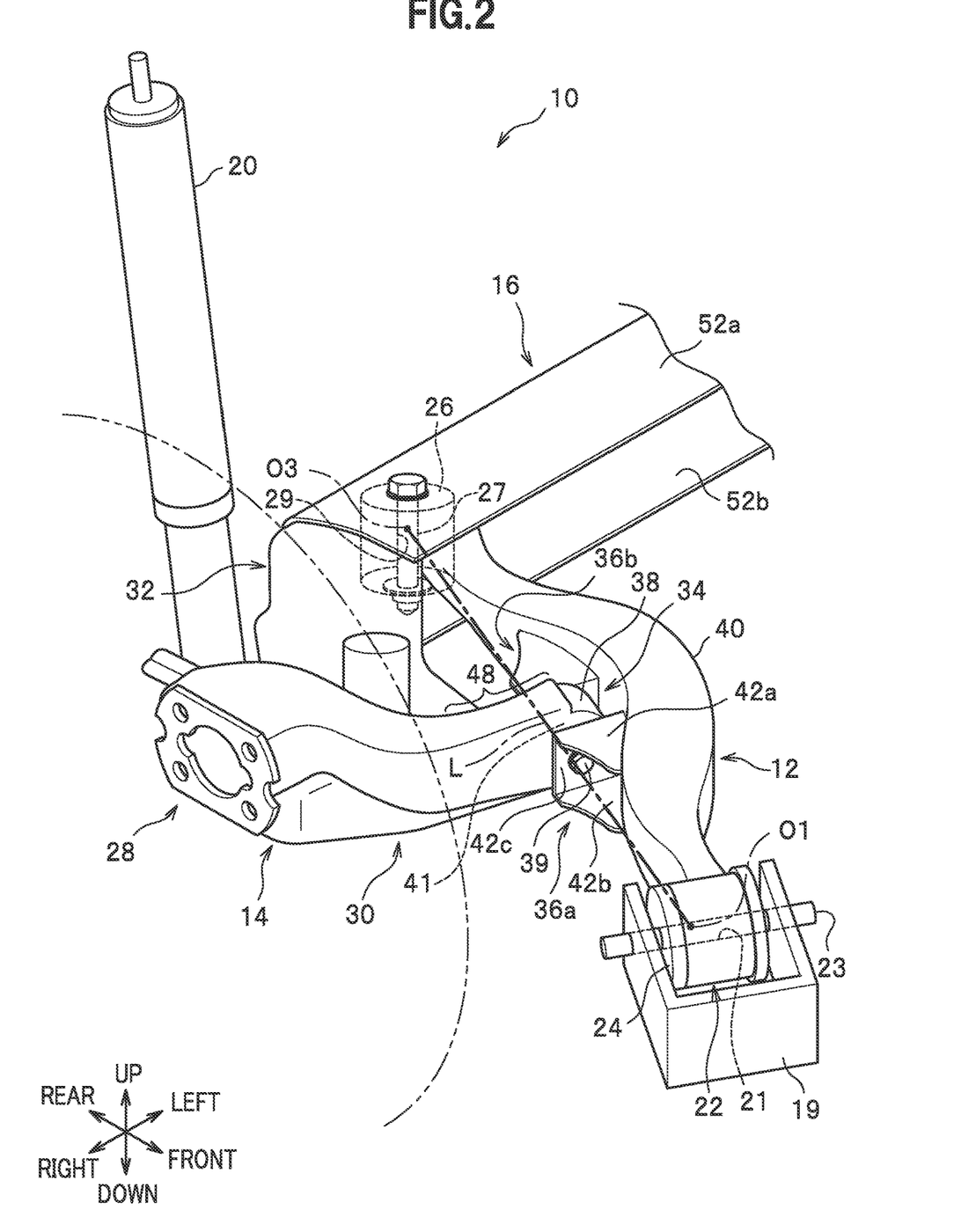
FIG. 2 is a partial enlarged perspective view of the rear suspension disposed on a right rear wheel as seen obliquely from the front of the vehicle.

As shown in FIGS. 1 and 2, the front arm part 30 is coupled to the corresponding trailing arm 12 via a front arm attachment part 34 disposed on a substantially center portion of the trailing arm 12. Specifically, the vehicle front end of the front arm part 30 is pivotally attached to a pair of attachment pieces 36a and 36b fixed to the trailing arm 12 via a second bush 38. This second bush 38 is provided with a second fixing hole 41 to fix a second support shaft 39 fitted in the center of the second bush 38. The second support shaft 39 extends substantially in the vehicle front-rear direction through the second fixing hole 41. At least part of the second fixing hole 41 is disposed on a phantom line L connecting the center O1 of the first support shaft 23 of the first bush 24 and the center O3 of the third support shaft 27 of the third bush 26 (see FIG. 2). The second fixing hole 41 will be described later in detail.

Figure 7:
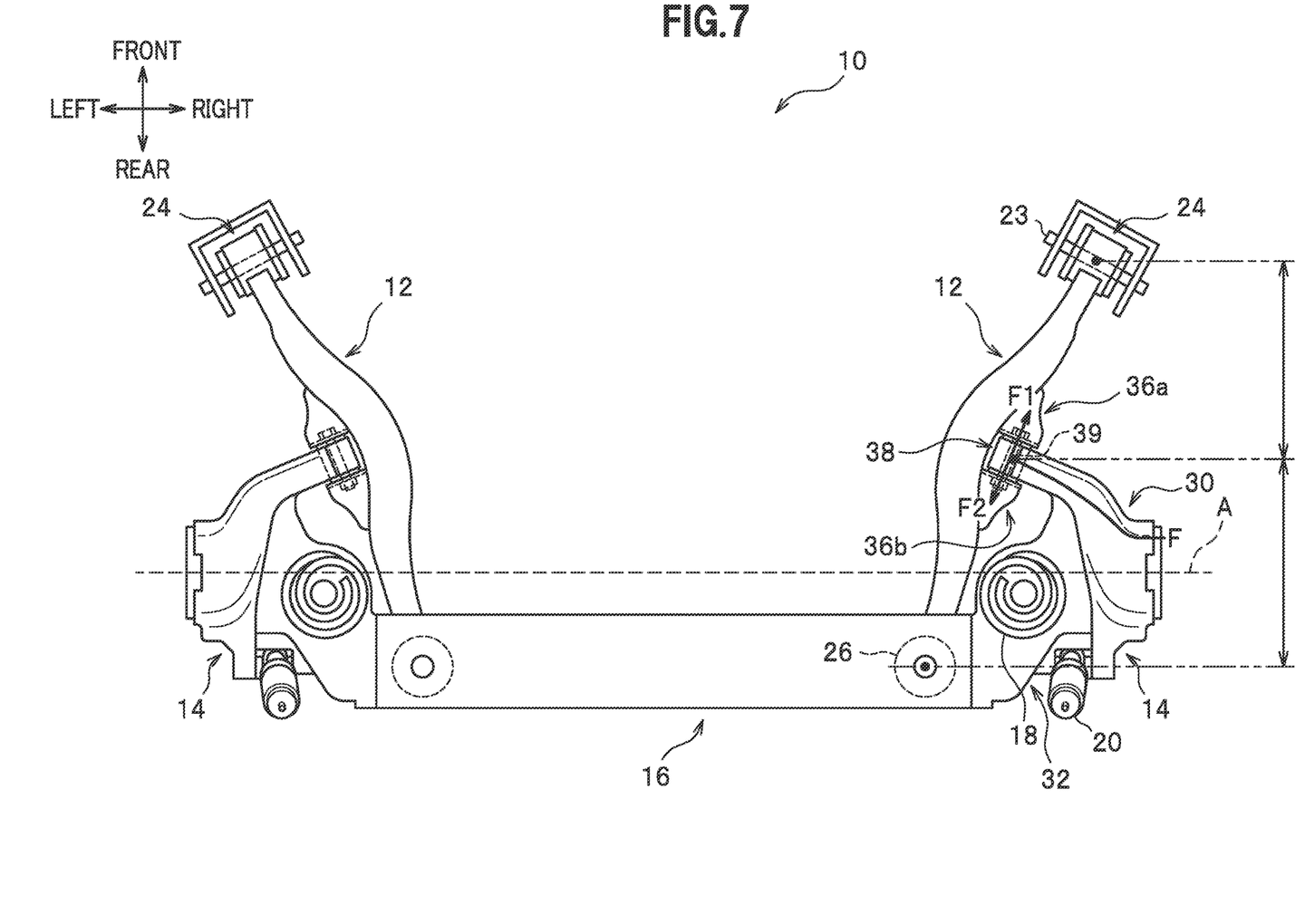
FIG. 7 is a plan view showing a state where front arm extending portions are perpendicularly attached to front arm attachment parts on trailing arms.

The second bush 38 is disposed substantially at the center of the trailing arm 12 in the vehicle front-rear direction (see FIG. 7). Moreover, the axial direction of the first support shaft 23 of the first bush 24 and the axial direction of the second support shaft 39 of the second bush 38 are oriented to be different from each other (see FIG. 1).

As shown in FIG. 2, the front arm attachment part 34 includes the pair of attachment pieces 36a and 36b disposed on the trailing arm 12; the second bush 38 mounted to the vehicle front end portion; and the second support shaft 39 fitted in the second bush 38 and pivotally supported between the pair of attachment pieces 36a and 36b. Specifically, each trailing arm 12 includes a curved portion 40 bent inward in the vehicle width direction. The pair of attachment pieces 36a and 36b disposed so as to face each other are disposed on the outer side of this curved portion 40 in the vehicle width direction.

As shown in FIG. 2, each attachment piece 36a (36b) assumes a substantially triangular shape in plan view. Each attachment piece 36a (36b) includes an upper wall 42a and a lower wall 42b disposed so as to face each other in the up-down direction; and a sidewall 42c coupling an inner end portion (outer end portion) of the upper wall 42a and an inner end portion (outer end portion) of the lower wall 42b to each other. This sidewall 42c has support holes disposed so as to face each other substantially horizontally and pivotally supporting both the ends of the second support shaft 39.

An inner end portion 44 of the rear arm part 32 of each hub carrier 14 in the vehicle width direction is coupled to an outer end portion 46, in the vehicle width direction, of the lateral beam 16 extending in the vehicle width direction.

As shown in FIG. 5, each trailing arm 12 is disposed at the oblique angle θ to the vehicle front-rear direction toward the outer side in the vehicle width direction in plan view so that the vehicle front end portion (vehicle body attachment part 22) is situated on the outer side of the vehicle relative to the vehicle rear end portion 25. The front arm part 30 of each hub carrier 14 includes a front arm extending portion 48 extending in a direction substantially perpendicular to this oblique angle θ in plan view (see FIG. 5). This front arm extending portion 48 is coupled to the front arm attachment part 34. A joint 50 (second support shaft 39) between the front arm extending portion 48 and the front arm attachment part 34 is disposed on the phantom line L connecting the center O1 of the first support shaft 23 of the first bush 24 and the center O3 of the third support shaft 27 of the third bush 26 (see FIG. 5).

Figure 4:
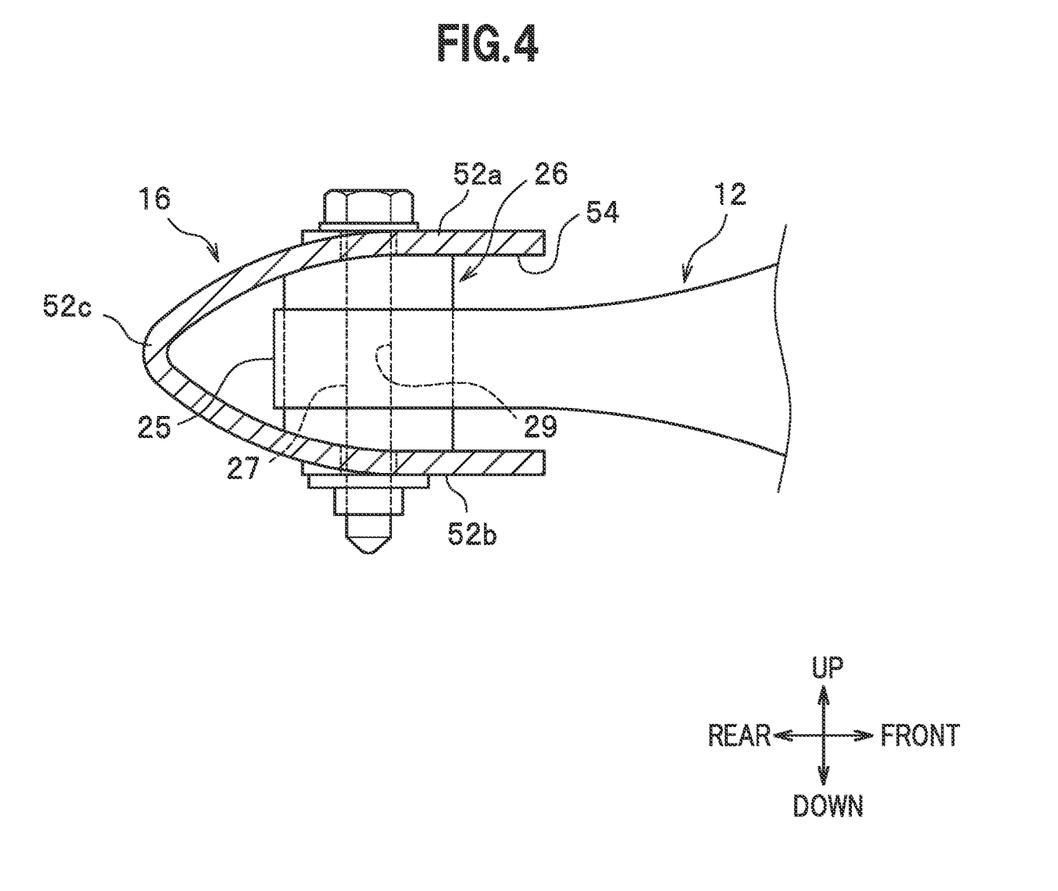
FIG. 4 is a vertical cross-sectional view along the IV-IV line in FIG. 1.

As shown in FIG. 4, a cross section of the lateral beam 16 perpendicular to its axis assumes a substantially V-shape. The lateral beam 16 includes an upper inclined wall 52a inclined so as to extend obliquely upward from a middle portion 52c bent toward the rear of the vehicle. The lateral beam 16 includes a lower inclined wall 52b inclined so as to extend obliquely downward from the middle portion 52c. The upper and lower inclined walls 52a and 52b are formed integrally with each other. An opening portion 54 facing toward the front of the vehicle is disposed between a vehicle front end portion of the upper inclined wall 52a and a vehicle front end portion of the lower inclined wall 52b. The vehicle rear end portion 25 of each trailing arm 12 and the third bush 26 are inserted through this opening portion 54.

The third support shaft 27 is disposed between the upper and lower inclined walls 52a and 52b. The third support shaft 27 is pivotally supported in the up-down direction through support holes disposed respectively in the upper and lower inclined walls 52a and 52b.

In the present embodiment, the axial directions of the first support shaft 23 of the first bush 24, the second support shaft 39 of the second bush 38, and the third support shaft 27 of the third bush 26 are oriented in mutually different directions (see FIG. 1).

As shown in FIG. 1, in the present embodiment, the coil springs 18 and the dampers 20 are not disposed coaxially with each other but are disposed about different axes on the rear side of the vehicle relative to the axle A. In this case, the coil springs 18 are disposed near the axle A toward the front of the vehicle, and the dampers 20 are disposed at positions closer to the rear of the vehicle than the coil springs 18 are. The coil springs 18 and the dampers 20 may be disposed coaxially with each other such that the coil springs 18 are coiled around the outer sides of the dampers 20.

The configurations of the first, second, and third bushes 24, 38, and 26 are substantially the same. Each bush 24 (38, 26) includes a cylindrical outer tube, for example. Each bush 24 (38, 26) includes an inner tube coaxially disposed in the outer tube and having a through-hole penetrating through the center of the inner tube in the axial direction. Each bush 24 (38, 26) includes a rubber elastic member disposed between the inner surface of the outer tube and the outer surface of the inner tube and elastically coupling the outer and inner tubes to each other. Each bush 24 (38, 26) includes the support shaft 23 (39, 27) fitted in and fixed to the through-hole in the inner tube in the axial direction. The through-hole in the inner tube functions as the fixing hole 21 (41, 29) to fix the support shaft 23 (39, 27). Each bush 24 (38, 26) serves a vibration isolating effect by elastic deformation of the rubber elastic member.

The rear suspension 10 according to the present embodiment is basically configured as described above. Next, its operation and advantageous effects will be described.

In the present embodiment, each hub carrier 14 includes the front arm part 30 extending toward the inner side of the vehicle on the front side of the vehicle relative to the axle A of the rear wheels, and the rear arm part 32 extending toward the rear of the vehicle. The rear arm part 32 is coupled (joined) to the lateral beam 16 extending in the vehicle width direction on the rear side of the vehicle relative to the axle A. The vehicle rear end portion 25 of each trailing arm 12 extending in the vehicle front-rear direction is coupled to the lateral beam 16. There are disposed the first bush 24 coupling the vehicle front end portion of the trailing arm 12 to the vehicle-body member, and the second bush 38 coupling the front arm part 30 to the front arm attachment part 34 disposed on the trailing arm 12. The axial directions of the first support shaft 23 of the first bush 24 and the second support shaft 39 of the second bush 38 are oriented in mutually different directions.

Figure 6:
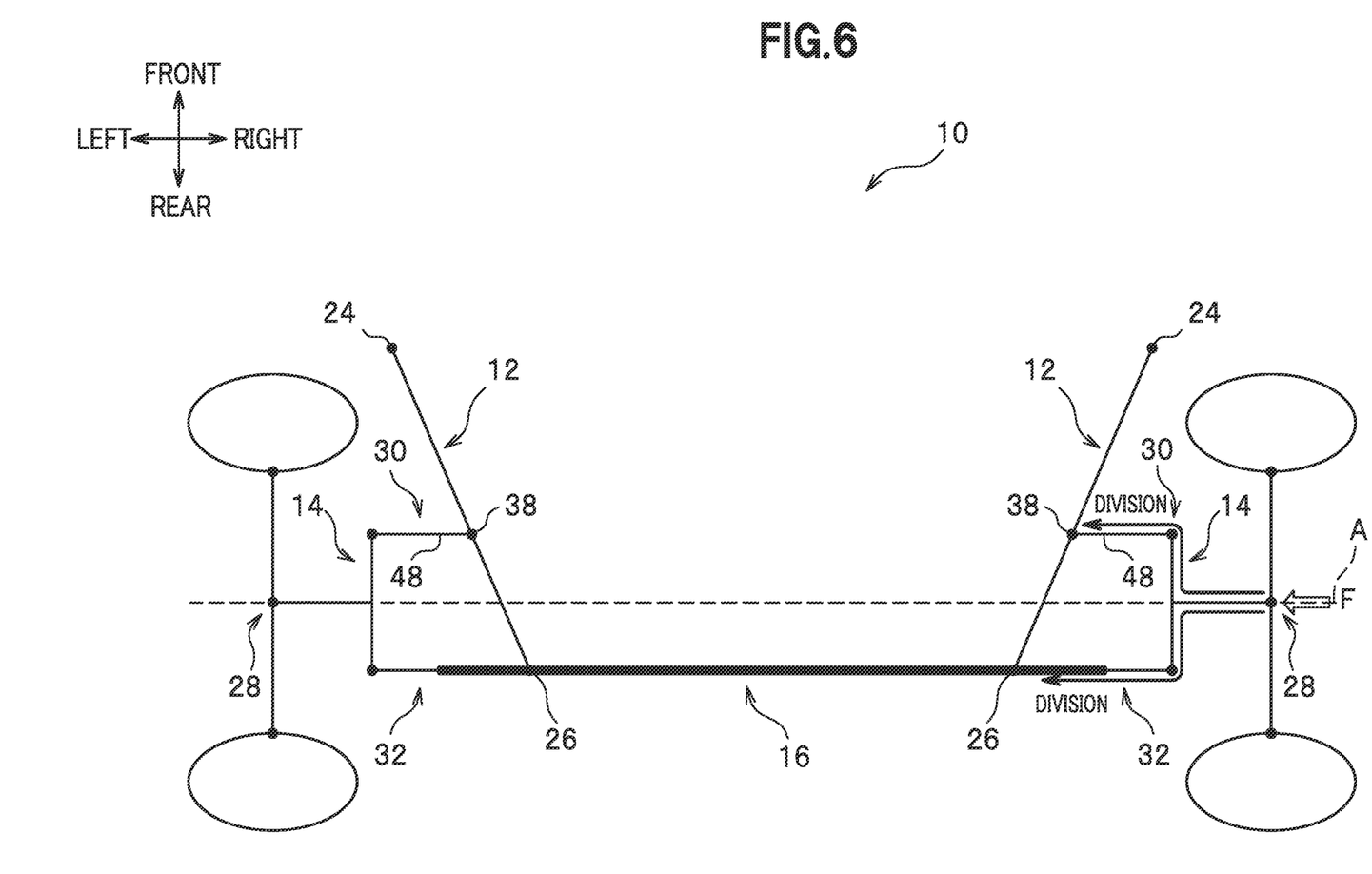
FIG. 6 is a schematic plan view of the rear suspension shown in FIG. 1.

In the present embodiment, as shown in FIG. 6, each hub carrier 14 rotatably supporting the corresponding rear wheel is bifurcated such that a lateral force F exerted on the rear wheel is divided and transmitted respectively to the lateral beam 16 coupled to the rear arm part 32 and the trailing arm 12 coupled to the front arm part 30.

In this way, in the present embodiment, the lateral force F exerted on the rear wheel is input and transmitted to the vehicle body using the flexural stiffness of the trailing arm 12. Moreover, unlike a conventional suspension type that includes a lateral beam disposed over an axle (rigid axle suspension), it is possible to omit a dedicated part that receives lateral inputs, such as a Panhard rod. Accordingly, in the present embodiment, a rear suspension construction capable of balancing flexural stiffness and torsional stiffness and also improving the packaging of a rear suspension is obtained.

In the present embodiment, no torsion beam is needed on the front side of the vehicle relative to the axle A. This makes it possible to provide a space in the area in a conventional torsion beam-type rear suspension construction where a torsion beam is disposed (e.g., an area under the cabin or the floor). In the present embodiment, this space is effectively utilized to improve convenience of the vehicle.

Moreover, in the present embodiment, during front-rear input, left-right input, and external input from the brake (brake input), the first bush 24 and/or the second bush 38 effectively receives the force which the vehicle receives from the wheel. Furthermore, in the present embodiment, the first bush 24 and/or the second bush 38 effectively serves a vibration isolating effect.

Figure 10:
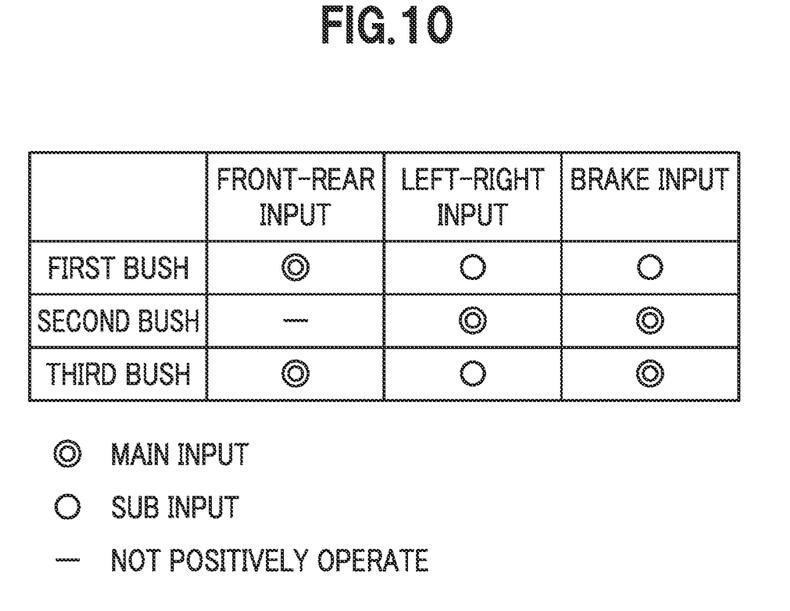
FIG. 10 is a table comparing how each bush in the rear suspension shown in FIG. 1 handles front-rear input, left-right input, and brake input.

Specifically, as shown in FIG. 10, the first bush 24 operates to handle front-rear input as main input and operates to handle left-right input and brake input as sub input. The second bush 38 does not operate to proactively handle front-rear input but operates to handle left-right input and brake input as main input. In this way, the first and second bushes 24 and 38, which are independently disposed about mutually different axes, cooperate with each other to effectively receive forces which the vehicle receives from the wheel while also serving a vibration isolating effect (shock absorbing effect). Accordingly, flexural stiffness and torsional stiffness are balanced.

In FIG. 10, "FRONT-REAR INPUT" refers mainly to input of a force when the vehicle moves over a dent or a bump on a road surface, "LEFT-RIGHT INPUT" refers mainly to input of a force from the wheel when the vehicle makes a turn (centrifugal force), and "BRAKE INPUT" refers mainly to input of a force in the vehicle up-down direction (a moment about the axis of the axle).

Generally, it is difficult for a bush to receive a large force in its axial direction. Moreover, if many bushes are disposed, the bushes may interfere with one another, which may lead to excessive constraint. Hence, in the present embodiment, as shown in FIG. 10, although the first to third bushes are disposed, the maximum number of bushes to handle a type of input as "main input" is set to two for each input direction (front-rear input, left-right input, and brake input).

In the present embodiment, the third bush 26 coupling the vehicle rear end portion 25 of the trailing arm 12, which extends in the vehicle front-rear direction, to the lateral beam 16 is further provided. In the present embodiment, the axial directions of the first support shaft 23 of the first bush 24, the second support shaft 39 of the second bush 38, and the third support shaft 27 of the third bush 26 are oriented in mutually different directions.

Thus, in the present embodiment, during front-rear input, left-right input, and external input from the brake (brake input), the first bush 24 and/or the second bush 38 and/or the third bush 26 cooperates to effectively receive the force which the vehicle receives from the wheel while also effectively serving a vibration isolating effect. Specifically, as shown in FIG. 10, in addition to the operations of the first and second bushes 24 and 38 described above, the third bush 26 operates to handle front-rear input and brake input as main input and operates to handle left-right input as sub input. As a result, the first, second, and third bushes 24, 38, and 26 independently disposed about mutually different axes cooperate with one another to effectively receive forces which the vehicle receives from the wheel while also effectively serving a vibration isolating effect. Hence, in the present embodiment, flexural stiffness and torsional stiffness are further balanced.

In the present embodiment, three bushes (first, second, and third bushes 24, 38, and 26) with support shafts extending in mutually different directions (first, second, and third support shafts 23, 39, and 27) are disposed on each trailing arm 12. The arrangements and configurations of these first, second, and third bushes 24, 39, and 27 improve stiffness of the trailing arm 12 (part stiffness). The lateral force F is finally divided and transmitted to the vehicle-body member through the first bush 24 and the lateral beam 16 through the third bush 26. In the present embodiment, this eliminates the need for a dedicated part that receives lateral inputs, such as a Panhard rod, for example, and enables transmission of the lateral force F to the vehicle-body member and the lateral beam 16 in a favorable manner.

Moreover, in the present embodiment, the third bush 26 has the third fixing hole 29 to fix the third support shaft 27 fitted in the center of the third bush 26. The third support shaft 27 extends in the vehicle up-down direction through the third fixing hole 29.

In this way, the third bush 26 effectively receives a force in the vehicle front-rear direction (front-rear input) and a force in the vehicle up-down direction (brake input).

Moreover, in the present embodiment, the first bush 24 has the first fixing hole 21 to fix the first support shaft 23 fitted in the center of the first bush 24. The first support shaft 23 extends substantially in the vehicle width direction through the first fixing hole 21.

In this way, the first bush 24 effectively receives a force substantially in the vehicle front-rear direction which is perpendicular to the first support shaft 23 extending substantially in the vehicle width direction.

Moreover, in the present embodiment, the second bush 38 has the second fixing hole 41 to fix the second support shaft 39 fitted in the center of the second bush 38. At least part of the second fixing hole 41 is disposed on the phantom line L connecting the first and third bushes 24 and 26. The second support shaft 39 extends substantially in the vehicle front-rear direction through the second fixing hole 41.

In the present embodiment, at least part of the second fixing hole 41 is disposed on the phantom line L connecting the first and third bushes 24 and 26. This prevents the trailing arm 12 from being turned about the phantom line L by the lateral force F exerted on the rear wheel. Since the second bush 38 is located at the axial center of the trailing arm 12, no rotational moment is generated. Also, the second support shaft 39 is pivotally supported in the second fixing hole 41 substantially in the vehicle front-rear direction. In this way, the second bush 38 effectively receives a force substantially in the vehicle width direction (a direction perpendicular to the phantom line L) perpendicular to the second support shaft 39 extending substantially in the vehicle front-rear direction.

Moreover, in the present embodiment, the second bush 38 is disposed substantially at the center of the trailing arm 12 in the vehicle front-rear direction.

In the present embodiment, the lateral force F exerted on the rear wheel is divided and transmitted to the lateral beam 16 coupled to the rear arm part 32 via the third bush 26 and to the trailing arm 12 coupled to the front arm part 30 via the second bush 38. The front arm part 30 is disposed substantially on the center of the trailing arm 12 with the second bush 38 therebetween. This allows for smoother transmission of the transmitted lateral force F to the trailing arm 12. Further, as shown in FIG. 7, the lateral force F transmitted to the trailing arm 12 is divided and transmitted to a portion of the trailing arm 12 closer to the front of the vehicle and a portion of the trailing arm 12 closer to the rear of the vehicle (see F1 and F2 in FIG. 7).

Moreover, in the present embodiment, each trailing arm 12 is disposed at the oblique angle θ toward the outer side in the vehicle width direction in plan view so that the vehicle front end portion (vehicle body attachment part 22) is situated on the outer side of the vehicle relative to the vehicle rear end portion 25 (see FIG. 5).

Figure 8:
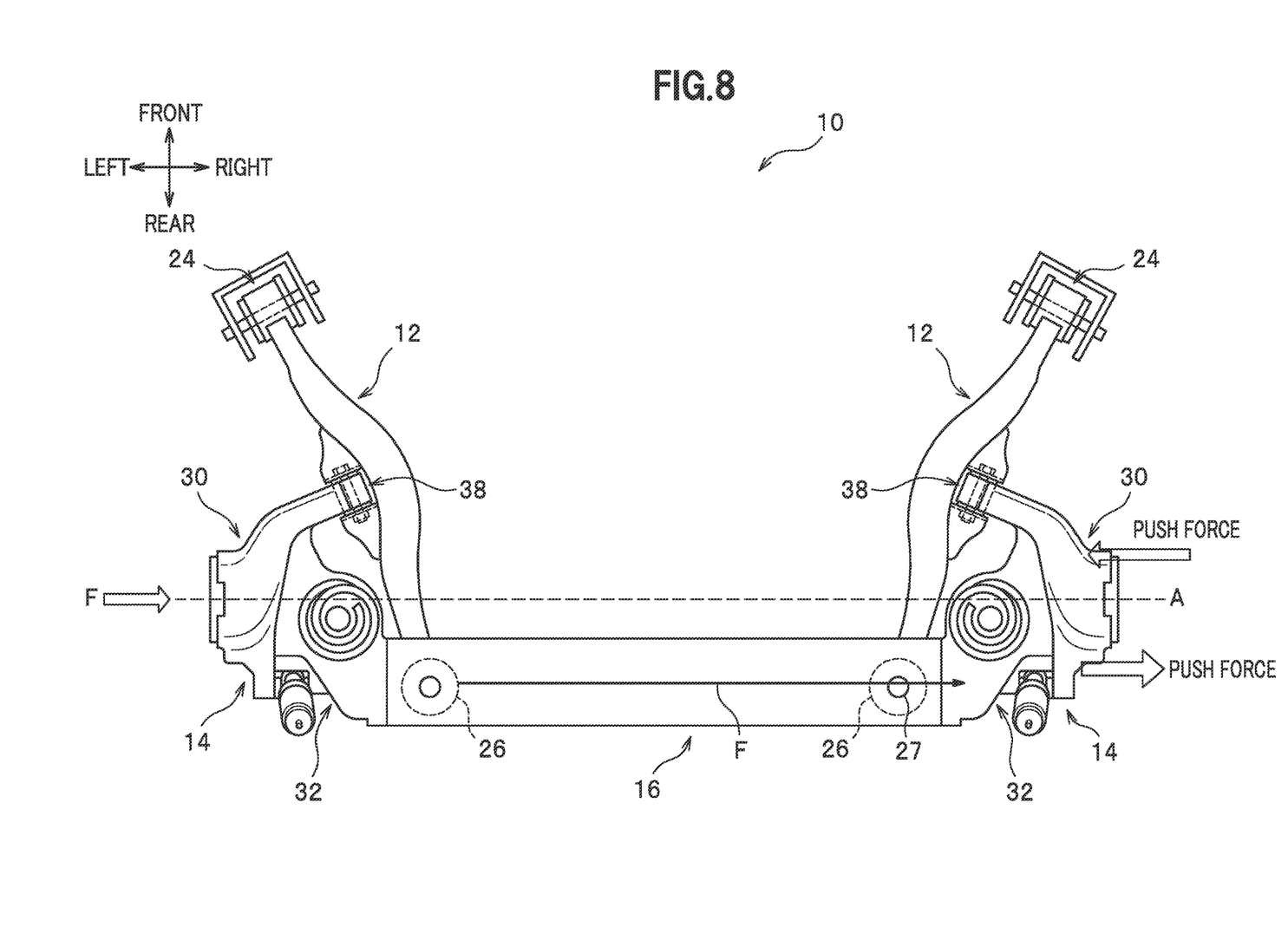
FIG. 8 is a schematic explanatory view of a characteristic feature that causes a hub carrier to turn in a toe-in direction when a lateral force is input.

In the present embodiment, the vehicle front end portion of each trailing arm 12 (vehicle body attachment part 22) is disposed so as to be oblique toward the outer side in the vehicle width direction (the pair of left and right trailing arms 12 and 12 are disposed in a substantially V-shape in plan view). This imparts a characteristic feature that causes a hub carrier 14 (rear wheel) to turn in the toe-in direction when the lateral force F is input (rear toe-in), which enhances the stability of travel of the vehicle. For example, as shown in FIG. 8, when the lateral force F is input from one of the rear wheels, the lateral force F is transmitted to the other rear wheel through the lateral beam 16. In this case, the rear arm part 32 of the hub carrier 14 is subjected to a force under which it is pushed outward in the vehicle width direction while the front arm part 30 of the hub carrier 14 is subjected to a force under which it is pushed inward in the vehicle width direction (see FIG. 8). In the present embodiment, this imparts a characteristic feature that causes the hub carrier 14 (rear wheel) to turn in the toe-in direction (rear toe-in) when the lateral force F is input.

Figure 9:
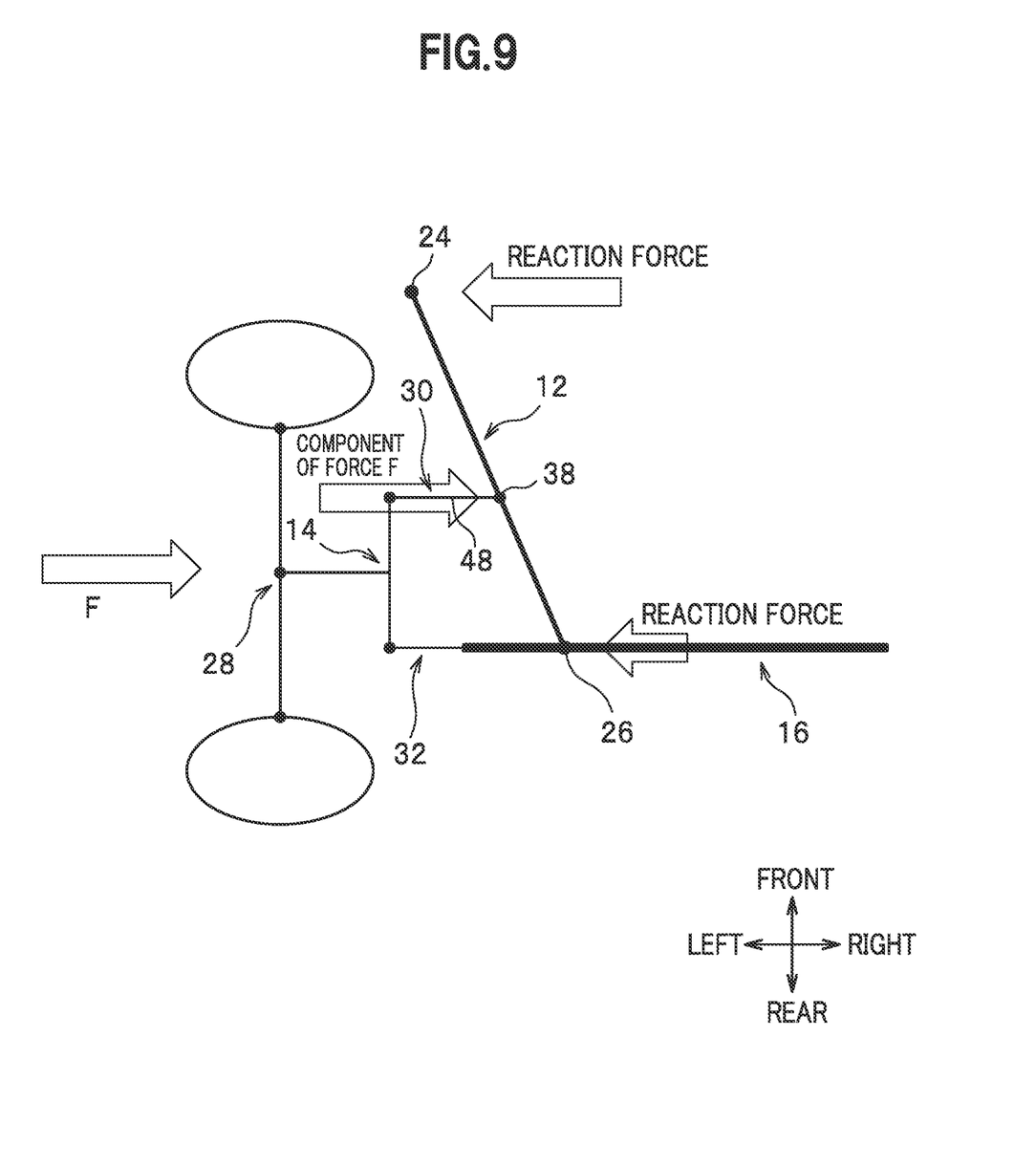
FIG. 9 is a schematic explanatory diagram showing how a lateral force is transmitted to a trailing arm in the state of FIG. 7.

Moreover, in the present embodiment, the front arm part 30 includes the front arm extending portion 48 extending in a direction substantially perpendicular to the oblique angle θ in plan view (see FIG. 5). This front arm extending portion 48 is attached to the front arm attachment part 34 of the trailing arm 12. In the present embodiment, since the front arm extending portion 48 of the hub carrier 14 is coupled substantially perpendicularly to the trailing arm 12, the lateral force F exerted on the rear wheel is smoothly transmitted to the trailing arm 12 (see FIG. 9).

What is claimed is:

1. A rear suspension construction for supporting a rear wheel of a vehicle, comprising:
   a hub carrier comprising a wheel support part rotatably supporting the rear wheel; a front arm part extending toward an inner side of the vehicle on a front side of the vehicle relative to an axle of the rear wheel; and a rear arm part extending on a rear side of the vehicle relative to the axle of the rear wheel;
   a lateral beam extending in a vehicle width direction on the rear side of the vehicle relative to the axle and joined to the rear arm part;
   a trailing arm extending in a front-rear direction of the vehicle and comprising a vehicle rear end portion joined to at least one of the hub carrier and the lateral beam;
   a first bush joining a vehicle front end portion of the trailing arm to a vehicle body;
   a second bush joining the front arm part to a front arm attachment part disposed on the trailing arm; and
   a third bush coupling the vehicle rear end portion of the trailing arm to the at least one of the hub carrier and the lateral beam, wherein a first support shaft of the first bush and a second support shaft of the second bush have respectively axial directions oriented differently from each other, wherein the second bush has a fixing hole for fixing the second support shaft fitted in a center of the second bush, and wherein at least part of the fixing hole of the second bush is disposed on a phantom line connecting the first bush and the third bush.

2. The rear suspension construction according to claim 1, further comprising:

wherein the first support shaft of the first bush, the second support shaft of the second bush, and a third support shaft of the third bush have respectively axial directions oriented differently from each other.

3. The rear suspension construction according to claim 2, wherein the second support shaft extends substantially in a vehicle front-rear direction through the fixing hole of the second bush.

4. The rear suspension construction according to claim 1, wherein the first bush has a fixing hole for fixing the first support shaft fitted in a center of the first bush, wherein the first support shaft extends substantially in a vehicle width direction through the fixing hole of the first bush.

5. The rear suspension construction according to claim 1, wherein the second bush is disposed substantially on a center, in a vehicle front-rear direction, of the trailing arm.

6. The rear suspension construction according to claim 1, wherein the third bush has a fixing hole for fixing the third support shaft fitted in a center of the third bush, wherein the third support shaft extends in a vehicle up-down direction through the fixing hole of the third bush.

* * * * *